Figures 1, 2, 3:
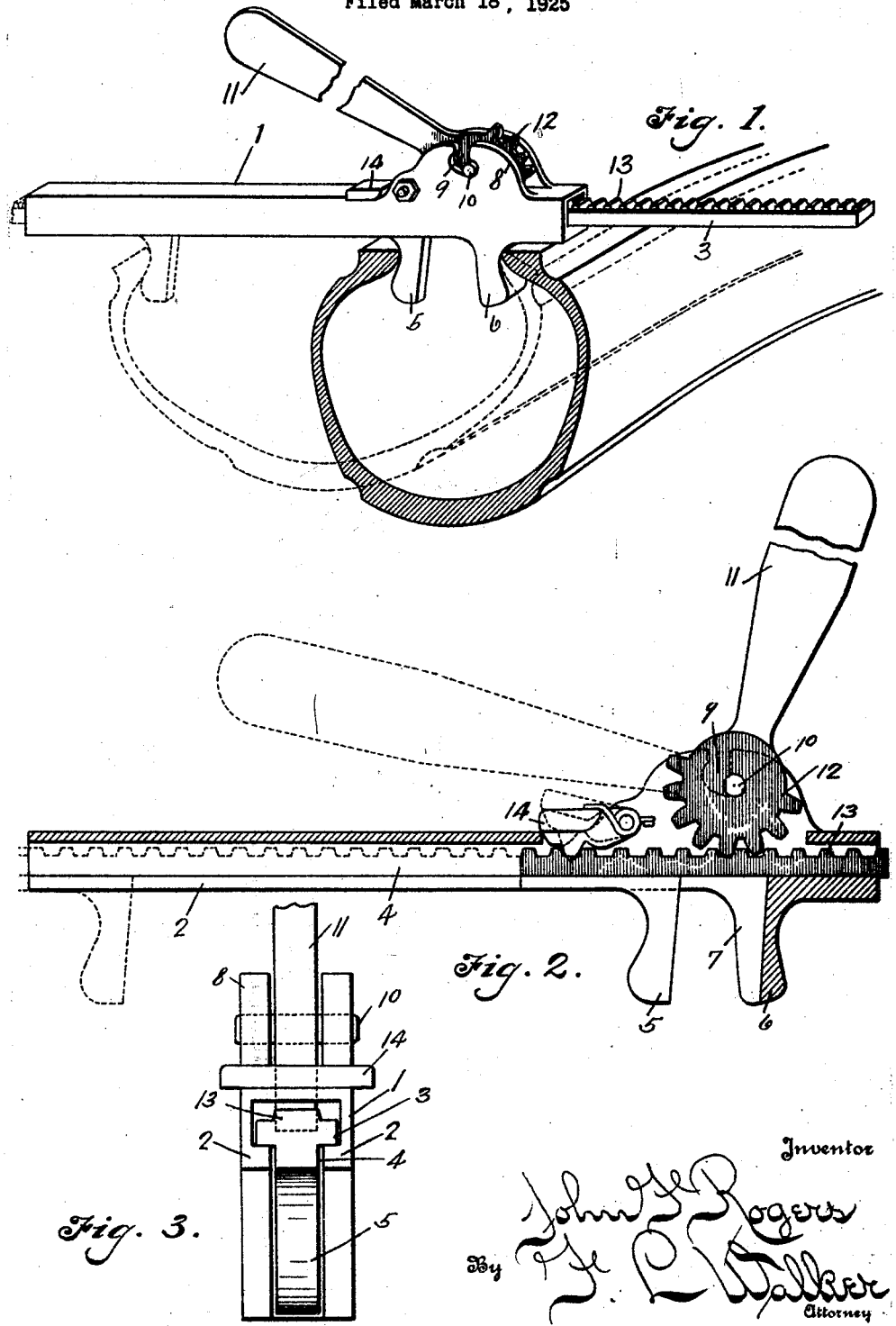

Feb. 2, 1926.

J. F. ROGERS 1,571,376

TIRE SPREADING TOOL

Filed March 18, 1925

Inventor
John F. Rogers
By F. L. Walker
Attorney

Patented Feb. 2, 1926.

1,571,376

UNITED STATES PATENT OFFICE.

JOHN F. ROGERS, OF DAYTON, OHIO.

TIRE-SPREADING TOOL.

Application filed March 18, 1925. Serial No. 16,482.

*To all whom it may concern:*

Be it known that I, JOHN F. ROGERS, a citizen of the United States, residing at Dayton, in the county of Montgomery and State of Ohio, have invented certain new and useful Improvements in Tire-Spreading Tools, of which the following is a specification.

This invention relates to tire tools and more particularly to an adjustable spreading device for pneumatic tire casings, to enable the operator or repairman to inspect and repair the interior of the casing.

The present form of tire casing spreader is especially applicable to tire casings of large size, particularly balloon tires, heavy truck tires and the like, as well as tire casings of smaller size such as used on pleasure vehicles. Tire casings, particularly those of larger sizes are quite stiff and resistant requiring the exertion of considerable power to distend and hold the casing open while repairs are being made. There is contemplated in the present invention, two telescopically adjustable spreader bars, each having a finger or prong projecting therefrom for engagement with the bead margins of the tire casings. These engaging fingers or prongs are adjustable to and from each other by the relative telescopic adjustment of the spreader bars. One of the spreader bars is provided with a series of rack teeth. An operating lever having a segmental gear head for engagement with the rack teeth of the telescopic bar is detachably connected with the complementary bar by being pivotally mounted in a slot within the limits of which the segmental head is movable into and out of engagement with the rack teeth of the adjustable bar. The bars are held in their adjusted position by a locking pawl pivotally mounted upon one of the members and spring actuated into engagement with the rack teeth to hold the telescopic bars in their position to which they have been adjusted against the resistance of the tire casing by the oscillation of the actuating lever.

The object of the invention is to simplify the structure as well as the means and mode of operation of tire distending and holding devices, whereby they will not only be cheapened in construction, but will be more efficient in use, positive in operation, uniform in action, easily and quickly applied and unlikely to get out of repair.

A further object of the invention is to provide a tire casing distending apparatus, which will be self locking in operative position, and which is not likely to become unlocked or disengaged from the casing while in use, and to provide operating means, which by repeated operation through the same range of movement will continue the distension of the spreader.

A further object of the invention is to provide distending and retaining means, applicable to tires of different sizes and capable of affording different degrees of distension thereof.

With the above primary and other incidental objects in view as will more fully appear in the specification, the invention consists of the features of construction, the parts and combinations thereof, and the mode of operation or their equivalents as hereinafter described and set forth in the claims.

In the accompanying drawings, wherein is shown the preferred, but obviously not necessarily the only form of embodiment of the invention, Fig. 1 is a perspective view of the assembled tire spreader showing it applied to a pneumatic tire casing, preparatory to distending the same and showing by dotted lines, the tire in its distended or spread condition. Fig. 2 is a longitudinal sectional view of the assembled spreader. Fig. 3 is an end elevation, viewed from the left of Figs. 1 and 2.

Like parts are indicated by similar characters of reference thruout the several views.

In constructing the spreader, there is employed a main frame or housing member 1, having therein longitudinally disposed gibbs or ways 2, upon which is slidingly mounted for reciprocatory movement a rack bar 3. The housing member 1 is slotted on its under side at 4, thru which slot extends a finger or tire engaging prong 5, carried by the rack bar 3. The main frame or housing member 1 carries a complementary finger or prong 6, projecting from its under side. This finger or prong 6 carried by the main frame is recessed at 7 to receive the finger or prong 5 of the rack bar in overlapping relation when such fingers are relatively retracted. Formed upon the main member 1 is a head portion 8, having in the side walls thereof, angularly disposed slots 9. These slots 9 receive the trunnion stud 10 of an oscillatory actuating lever 11, having a gear sector head 12. The slots 9 are somewhat inclined or cam shaped and are so disposed that as the trunnion stud 10 is shifted to and fro within such slot 9, the peripheral gear teeth of the head 12 of the operating lever 11 are moved into and out of engaging relation with the rack teeth 13 of the reciprocatory bar 3. A spring actuated detent 14 is pivoted to the main frame member 1 adjacent to the head 8. The beak or tooth of this detent engages with the teeth 13 of the reciprocatory rack bar 3 and is so shaped as to permit the ready movement of the rack bar in one direction past the detent, but locks such bar against return movement.

In operation the lever 11 being turned to the position shown in Fig. 1 or by dotted lines in Fig. 2 is thrust downward in the slot 9, causing the peripheral teeth in the head 12 to interengage with the teeth 13 in the rack bar 3. Upon oscillatory movement of the lever 11, the rotation of the gear sector 12 actuates the rack bar to separate the fingers or prongs 5 and 6, which have been engaged intermediate the beaded edges of the tire casing as shown in Fig. 1. During such adjusting movement of the rack bar 3, the detent 14 rides idly over the teeth 13 dropping behind each tooth as it passes the detent position. At the limit of the stroke the actuating lever 11 is shifted moving the trunnion stud 10 up the incline of the slot 9 disengaging the gear head 12 from the rack bar, preparatory to securing a new purchase upon the rack bar 3. At each repeated operation of the actuating lever 11, the rack bar 3 is advanced an additional distance thus separating the casing engaging fingers or prongs 5 and 6 to greater distance, correspondingly distending the tire casing to greater degree. When the casing has been distended to the desired spread, the operating lever 11 is disengaged by withdrawing the trunnion stud 10 entirely from the slot 9, thereby removing the lever from the way of the operator in inspecting and repairing the tire casing. To disengage the spreader from the distended tire casing, it is only necessary to raise the detent 14 out of engagement with the tooth 13 of the rack bar 3, whereupon the rack bar will be released for return sliding movement, causing the finger or prong 5 to approach the finger 6 and permitting the spreader to be easily removed from the tire casing.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific details shown, but that the means and construction herein disclosed comprises the preferred form of several modes of putting the invention into effect and the invention is, therefore, claimed in any of its forms or modifications within the legitimate and valid scope of the appended claims.

Having thus described my invention, I claim:

1. In a tire spreading tool, two telescopically arranged bars, one of the bars having thereon a series of spaced teeth, an actuating lever detachably engageable with the other bar and having operative engagement with the successive teeth of the toothed bar to advance the bar by the oscillation of the lever, a detent for retaining the bars in their relatively adjusted positions, and tire engaging fingers carried by the respective bars and adjustable toward and from each other by the relative adjustment of the bars.

2. In a tire spreading tool, two telescopically arranged bars, tire engaging fingers carried by the respective bars and movable toward and from each other by the relative adjustment of the bars, means for forcibly reciprocating said bars one relative to the other, and means for temporarily retaining the bars in their adjusted positions.

3. In a tire spreading tool, a rack bar, a guide bar in which the rack bar is mounted for reciprocatory movement, tire engaging fingers carried by each bar and movable toward and from each other by the relative adjustment of the bars, a gear member mounted upon the guide bar and engaging the teeth of the rack bar to adjust said bars one relative to the other, and a detent temporarily interlocking the bars against retrograde movement.

4. In a tire spreading tool, a rack bar, a guide bar in which the rack bar is mounted for reciprocatory movement, a tire engaging finger carried by each bar and movable toward and from each other by the relative adjustment of the bars, an actuating lever having a shifting pivotal mounting upon the guide bar and movable into and out of engagement with the teeth of the rack bar by the shifting of its pivotal connection, said lever by its operation when engaged with the rack bar serving to reciprocate the rack bar and a detent for temporarily locking the rack bar in adjusted position.

5. In a tire spreading tool, a rack bar, a guide bar in which the rack bar is mounted for reciprocatory movement, a tire engaging finger carried by each bar and movable toward and from each other by the relative adjustment of the bars, an operating lever, a gear sector carried by the lever and engageable with the rack bar, a trunnion stud for the sector, and a cam slot upon the guide bar in which the trunnion stud is movable to shift the gear sector into and out of engagement with the rack bar.

6. In a tire spreading tool, two telescopically arranged relatively adjustable bars, tire engaging projections carried by the respective bars and movable toward and from each other by the adjustment of one member telescopically relative to the other, an operating lever, a trunnion stud for said lever, a cam slot in one of the bars in which said trunnion stud engages, said stud being laterally adjustable within said cam slot to shift the lever into and out of engagement with the other bar, said lever being capable of oscillatory movement while engaged with said other bar to relative move said bars, and a detent for temporarily retaining the bars in adjusted relation.

7. In a tire spreading tool, two telescopically arranged relatively adjustable bars, tire engaging projections carried by the respective bars and movable toward and from each other by the adjustment of one member telescopically relative to the other, an operating lever carried by one of the bars, having operative engagement with the other bar capable of oscillatory movement by which the bars are adjusted one relative to the other, and further capable of lateral shifting movement independent of its oscillatory movement, by which the lever is engaged with and disengaged from such other bar, and a detent temporarily holding the bars in their relatively adjusted positions.

8. In a tire spreading tool, two bars arranged for relative reciprocatory movement, an actuating lever for relatively adjusting the bars in longitudinal directions, a detent for temporarily maintaining the bars in their positions of relative adjustment, and tire engaging fingers carried by the respective bars, and movable toward and from each other by the relative adjustment of the bars.

9. In a tire spreading tool, two bars arranged for relative reciprocatory movement, an actuating lever for relatively adjusting the bars in longitudinal directions, a detent for temporarily maintaining the bars in their positions of relative adjustment, and tire engaging fingers carried by the respective bars, said fingers assuming overlapping relation when fully retracted and movable toward and from each other by the adjustment of the bars.

In testimony whereof, I have hereunto set my hand this 13th day of March A. D. 1925.

JOHN F. ROGERS.